United States Patent [19]

Chambless

[11] E Re. 30,745

[45] Reissued Sep. 22, 1981

[54] REVERSE CYCLE HEAT PUMP CIRCUIT

[75] Inventor: Leo B. Chambless, Norman, Okla.

[73] Assignee: General Electric Company, Louisville, Ky.

[21] Appl. No.: 85,436

[22] Filed: Oct. 25, 1979

Related U.S. Patent Documents

Reissue of:

[64] Patent No.: 4,057,977
Issued: Nov. 15, 1977
Appl. No.: 729,907
Filed: Oct. 6, 1976

[51] Int. Cl.[3] ..... F25B 13/00

[52] U.S. Cl. ..... 62/324.1; 165/97

[58] Field of Search ..... 62/324 R, 504; 165/97

[56] References Cited

U.S. PATENT DOCUMENTS

| | | | |
|---|---|---|---|
| 2,463,881 | 3/1949 | Kemler | 62/324 |
| 2,581,744 | 1/1952 | Zimmerman | 62/324 |
| 2,716,870 | 9/1955 | Biehn | 62/160 |
| 2,785,540 | 3/1957 | Biehn | 62/160 |
| 2,924,079 | 2/1960 | Owens | 62/160 |
| 2,932,178 | 4/1960 | Armstrong et al. | 62/324 |
| 2,940,281 | 6/1960 | Armstrong | 62/428 |
| 3,024,619 | 3/1962 | Gerteis et al. | 62/160 |
| 3,132,490 | 5/1964 | Schmidt | 62/324 |
| 3,142,970 | 8/1964 | Hale | 62/324 |
| 3,150,501 | 9/1964 | Moore | 62/174 |
| 3,358,470 | 12/1967 | Frediani | 62/196 |
| 3,534,806 | 10/1970 | Rodgers | 165/1 |
| 3,731,497 | 5/1973 | Ewing | 62/160 |
| 3,977,210 | 8/1976 | Bruguier | 62/324 |

*Primary Examiner*—Lloyd L. King
*Attorney, Agent, or Firm*—Frederick P. Weidner; Radford M. Reams

[57] ABSTRACT

A reverse cycle heat pump refrigeration system including multi-circuited heat exchangers arranged to provide a series of refrigerant flow through the circuits for either heat exchanger when it is used as a condenser, and a parallel refrigerant flow through the circuits for either heat exchanger when it is used as an evaporator.

10 Claims, 1 Drawing Figure

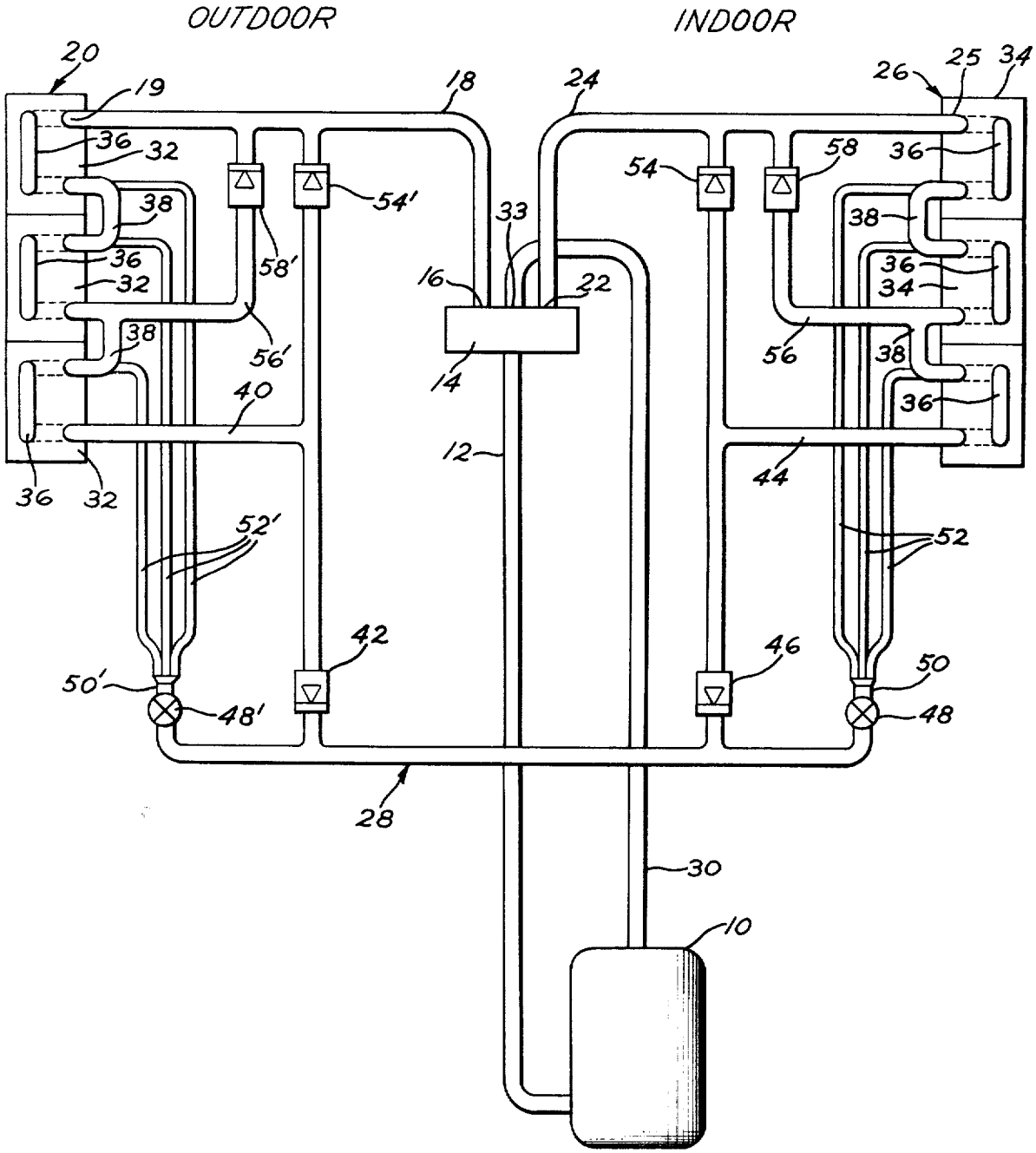
OUTDOOR
INDOOR
20
19
18
24
26
25
34
36
32
38
54'
58'
33
54
58
16
22
56'
14
56
40
12
44
52'
52
42
46
50'
48'
50
48
28
30
10

REVERSE CYCLE HEAT PUMP CIRCUIT

Matter enclosed in heavy brackets [ ] appears in the original patent but forms no part of this reissue specification; matter printed in italics indicates the additions made by reissue.

BACKGROUND OF THE INVENTION

As is well known in the air conditioning art, and more particularly those employing hermetic refrigeration systems, maximum efficiency of an evaporator is attained by maintaining the refrigerant stream leaving the evaporator in a saturated gaseous state so that the entire heat transfer surface of the evaporator is subjected to heat absorption by vaporization. With this ideal condition, therefore, the refrigerant absorbs latent heat in the evaporator and no sensible heat to raise its temperature following vaporization with the result that the maximum available refrigerating [affect] *effect* is attained. It has been general practice in the refrigeration industry to size evaporator coils with an amount of surface and pressure drop to assure that the refrigerant leaving the evaporator is in an expanded and superheated gaseous state.

The condenser, on the other hand, is designed to provide totally liquid phase refrigerant to the expansion or capillary valve, which, as is well known cannot tolerate any significant amount of refrigerant gas. Consequently, the refrigerant must be totally condensed to a liquid phase in the condenser.

Conventional heat pump refrigeration systems of the type to which this invention particularly relates comprises indoor and outdoor coils or heat exchangers connected to a closed refrigerant circuit. Refrigerant is circulated through the coils by a compressor which pumps the compressed refrigerant gas through the coil where it is condensed and passes through a means for expansion, such as a capillary tube or expansion valve, to the other coil for evaporation. The system includes suitable change-over valve mechanisms for reversing the function of the indoor and outdoor heat exchangers permitting the indoor exchanger to function as an evaporator for summertime cooling or as a condenser for wintertime heating, the upper coil performing the opposite function.

One of the shortcomings of the prior art heat pump refrigeration systems of the type described above is their incapability of the heat exchangers to operate efficiently both as evaporators and condensers. This is especially true since it takes a greater pressure drop through the condenser to change the high pressure gas to a high pressure liquid than it does for the evaporator to change low pressure liquid to a low pressure gas. Accordingly in heat pump or reverse cycle refrigeration systems when the coils designed to operate as evaporators and condensers are reversed in the refrigeration cycle they are inefficient.

SUMMARY OF THE INVENTION

A reversible refrigeration system for heating and cooling generally includes a hermetic motor compressor unit, an indoor heat exchanger and an outdoor heat exchanger each including a plurality of circuits, and a valve for reversing the flow of refrigerant through the system to operate it in a heating or cooling mode with each heat exchanger arranged interchangeably as a condenser or as an evaporator.

The circuits are connected in series between a heat exchanger inlet and outlet when a heat exchanger operates as a condenser with a conduit connecting the outlets of the heat exchangers. A pair of one way valves are arranged in the conduit to allow passage of refrigerant through the coils in series when a heat exchanger is operating as a condenser and for preventing series flow through the circuits when a heat exchanger is operating as an evaporator.

A plurality of distribution means are connected at one end to the conduit and at the other end to each of the circuits so that the circuits are arranged in parallel when the heat exchanger operates as an evaporator. Means including valves are arranged between the circuits and the reversing valve for permitting refrigerant flow from each of the circuits when a heat exchanger is operating as an evaporator; and for directing all of the refrigerant flow through the inlet when a heat exchanger is operating as a condenser.

It is an object of the invention to provide a heat pump system wherein the indoor and outdoor heat exchangers function interchangeably as evaporators or condensers.

Another object of the invention is to provide a heat pump system wherein the indoor and outdoor heat exchangers are identical in configuration.

BRIEF DESCRIPTION OF THE DRAWINGS

The single FIGURE of the drawing shows schematically a reversible heat pump system embodying the invention.

DESCRIPTION OF THE PREFERRED EMBODIMENT

Referring now to the drawing, a conventional reversible cycle heat pump system is shown including a compressor 10 having a high pressure gas discharge connected by a conduit 12 to the intake of a reversing valve 14. One reverse flow port 16 of valve 14 is connected by a conduit 18 to a line 19 of a heat exchanger 20 which when it is used as a condenser is the inlet line. Heat exchanger 20 is preferably located or arranged so that it is subjected to outdoor air and is hereinafter referred to as the "outdoor coil." A second reverse flow port 22 of the valve 14 is connected by conduit 24 to a line 25 of a heat exchanger 26 which when it is used as a condenser is the inlet line. Heat exchanger 26 is disposed so that it is subjected to recirculated indoor air and is hereinafter referred to as the "indoor coil."

The low pressure intake or suction port of compressor 10 is connected by a conduit 30 to the exhaust port [32] *33* of valve 14, which port is selectively connected with either reverse flow ports 16 and 22. In the cooling position the valve 14 is arranged so that the high pressure discharge gas from conduit 12 is directed through port 16 and connected through conduit 18 to the outdoor coil 20 which in the cooling cycle is used as the condenser. The suction or intake low pressure gas returning to the compressor from heat exchanger 26 which is being used as the evaporator during the cooling cycle is through inlet line 25, conduit 24, reverse flow port 22, suction line 30 and back to the compressor 10. To complete the refrigeration cycle the heat exchangers 20 and 26 are, as will be explained later in the description of the system, interconnected by a conduit 28.

Each of the heat exchangers 20 and 26 include a plurality of circuits 32 and 34 respectively. While in accordance with the embodiment of the invention shown three circuits are employed in each of the heat exchangers 20 and 26 to carry out the present invention, it should be understood that the exact number of circuits for a specific heat pump system may be determined by one skilled in the art. By the reversible heat pump refrigeration system of the present invention a series refrigerant flow is provided through the circuits 32, 34 of either heat exchanger 20, 26 when it is used as a condenser, and a parallel refrigerant flow is provided through the circuits 32, 34 of either heat exchanger 20, 26 when it is used as an evaporator.

Each of the separate circuits 32 and 34 may comprise a conventional serpentine arranged tube 36 connected in series with the adjacent circuit of a heat exchanger by conduits or return bends 38. In the cooling mode the high pressure discharge gas from compressor 10 is directed from port 16 of valve 14 through conduit 18 and into the inlet line 19 of outdoor heat exchanger 20 which is in this instance operating as the condenser. High pressure gas flows from inlet 19 through the series arranged circuits in heat exchanger 20 and is condensed to a high pressure liquid which flows into an outlet which in this flow direction is conduit 40. From conduit 40 the high pressure gas passes through a one way check valve 42 and into the conduit 28 interconnecting heat exchangers 20 and 26.

It should be noted that the pressure drop through a heat exchanger operating as a condenser in a refrigeration system is generally more than that required for the heat exchanger operating as an evaporator. By the present invention when a heat exchanger is operating as a condenser the circuits therethrough are arranged in series so that the condenser will have enough length through each circuit to provide subcooling for the liquid refrigerant. As the refrigerant gas condenses to a high pressure liquid, it becomes dense and needs less area and volume for a given mass.

In the heating mode the high pressure discharge gas from compressor 10 is directed from port 22 of valve 14 through conduit 24 and into the inlet line 25 of indoor heat exchanger 26 which is in this instance operating as the condenser. High pressure gas flows from inlet 25 through the series arranged circuits in heat exchanger 26 and is condensed to a high pressure liquid which flows into an outlet which in this flow direction is an outlet 44. From conduit 44 the high pressure gas pours through a one way check valve 46 and into the conduit 28 interconnecting heat exchangers 20 and 26. Accordingly the above arrangement provides a series refrigerant flow through the circuits for either heat exchanger 20 or 26 in the cooling and heating cycle when they are used as condensers. This series refrigerant flow arrangement of the heat exchangers 20,26 when they are used as condensers allows an effective pressure drop that is sufficient to condense the high pressure gas into a liquid that may then pass effectively through the expansion or capillary portion of the system.

It should be noted that the pressure drop through a heat exchanger operating as an evaporator in a refrigeration system is generally less than that required of the heat exchanger operating as a condenser. By the present invention when a heat exchanger is operating as an evaporator the circuits therethrough are arranged in parallel so that the relative shorter length of each circuit keeps the pressure drop low while providing greater area and volume for the gas as boiling occurs at which time the liquid changes to a gas.

In the cooling mode high pressure liquid passing through valve 42 into conduit 28 continues through a thermostatic expansion valve 48 to a distributor 50. At this time valve 46 is effective in preventing high pressure liquid from entering conduit 44 and heat exchanger 26 which is operating as an evaporator. Distribution conduits 52 are connected between the distributor 50 and each of the circuits 34 of indoor heat exchanger 26. Accordingly the circuits 34 of the indoor heat exchanger 26 operating as the evaporator in the cooling mode are arranged in parallel so that a lower pressure drop is allowed therethrough relative to the series arranged circuits 32 in the outdoor heat exchanger 20 now operating as a condenser in the cooling mode.

In operation high pressure liquid flows into the thermostatic expansion valve 48 where expansion of the high pressure liquid takes place and the resultant low pressure liquid flows into each of the circuits 34 through conduits 52. It should be understood that a capillary tube may be employed in place of valve 48 to provide the appropriate expansion of the high pressure liquid. One of the parallel circuits of heat exchanger 26 is completed from capillary 52 through a circuit 34 and into conduit 44. Flow from conduit 44 then passes through a one way check valve 54 and into conduit 24 which is connected to suction conduit 30 through the reverse flow port 22 of valve 14. The pressure of high pressure liquid on the other side of valve 46 at this time prevents passage of refrigerant from conduit 44 into conduit 28. A second parallel circuit of heat exchanger 26 is completed through a conduit 56 and a one way check valve 58 and into conduit 24. The third parallel circuit through heat exchanger 26 is completed directly into conduit 24 through inlet 25. One way check valve 54 and 58 are effective in preventing flow into conduits 56 and 44 when the heat exchanger 26 is being used as a condenser.

In the heating mode high pressure liquid passing through valve 46 into conduit 28 continues through a thermostatic expansion valve 48' to a distributor 50'. At this time valve 42 is effective in preventing high pressure liquid from entering conduit 40 and heat exchanger 20 which is now operating as an evaporator. Distribution conduits 52' are connected between distributor 50' and each of the circuits 32 of outdoor heat exchanger 20. Accordingly the circuits 32 of the outdoor heat exchanger 20 operating as the evaporator in the heating mode are arranged in parallel so that a lower pressure drop is allowed therethrough relative to the series arranged circuits 34 in indoor heat exchanger 26 operating now as a condenser in the heating mode.

In operation high pressure liquid flows into the thermostatic expansion valve 48' when expansion of the high pressure liquid takes place and the resultant low pressure liquid flows into each of the circuits 32 through conduits 52'. Like heat exchanger 26 when it was operating as an evaporator, one of the parallel circuits of heat exchanger 20 is completed from capillary 52' through a circuit 32 and into conduit 40. Flow from conduit 40 then passes through a one way check valve 54' and into conduit 18 which is connected to suction line 30 through the reverse flow port 16 of valve 14. The presence of high pressure liquid on the other side of valve 42 at this time prevents passage of refrigerant flow from conduit 40 into conduit 28. A second parallel circuit through heat exchanger 20 is completed through a conduit 56', a one way valve 58' and into conduit 18. The third parallel circuit through heat exchanger 20 is completed directly into conduit 18. Like valve 54 and 58 valves 54' and 58' are effective in preventing flow into conduit 56' and 40 when heat exchanger 20 is operating as a condenser.

The foregoing is a description of the preferred embodiment of the invention. In accordance with the Patent Statutes, changes may be made in the disclosed apparatus and the manner in which it is assembled without actually departing from the true spirit and scope of this invention, as defined in the appended claims.

What is claimed is:

[1. A reversible refrigeration system adapted for heating and cooling, comprising:

a motor compressor unit;

an indoor heat exchanger and an outdoor heat exchanger each including a plurality of circuits;

a valve for reversing the flow of refrigerant through said system to operate said system in a heating or cooling mode with each of said heat exchangers arranged interchangeably as a condenser or as an evaporator;

a conduit interconnecting the outlets of said heat exchangers;

means connecting the circuits in each of said heat exchangers in series between a heat exchanger inlet line and an outlet line when a heat exchanger operates as a condenser; and means connecting the circuits in each of said heat exchangers in parallel between said conduit and said reversing valve when a heat exchanger operates as an evaporator.]

[2. The reversibe refrigeration system recited in claim 1 wherein:

means including a pair of one way valves arranged between said heat exchanger outlet lines and said conduit to allow passage of refrigerant into said conduit from said coils when a heat exchanger is operating as a condenser and for preventing series flow of refrigerant through said circuits from said conduit when a heat exchanger is operating as an evaporator.]

[3. The reversible refrigeration system recited in claim 1 wherein:

a plurality of distribution means connected at one end to said conduit and at the other end to each of said circuits to arrange said circuits in parallel when a heat exchanger operates as an evaporator.]

[4. The reversible refrigeration system recited in claim 1 wherein:

means including valves arranged between said circuits and said heat exchanger inlet lines for permitting parallel refrigerant flow through each of said circuits between said conduit and said heat exchanger inlet line when a heat exchanger is operating as an evaporator; and for directing all of said refrigerant flow from said heat exchanger inlet line to said series connected circuits when a heat exchanger is operating as a condenser.]

[5. A reversible refrigeration system adapted for heating and cooling, comprising:

a motor compressor unit;

an indoor heat exchanger and an outdoor heat exchanger each including a plurality of circuits;

a valve for reversing the flow of refrigerant through said system to operate said system in a heating or cooling mode with each of said heat exchangers arranged interchangeably as a condenser or as an evaporator;

means connecting the circuits in each of said heat exchangers in series between a heat exchanger inlet line connected to said reversing valve and an outlet line when a heat exchanger operates as a condenser;

a conduit connecting the outlets of said heat exchangers;

means including a pair of one way valves arranged between said heat exchanger outlet lines and said conduit to allow passage of refrigerant into said conduit from said coils when a heat exchanger is operating as a condenser and for preventing series flow of refrigerant through said circuits from said conduit when a heat exchanger is operating as an evaporator;

a plurality of distribution means connected at one end to said conduit and at the other end to each of said circuits to arrange said circuits in parallel when a heat exchanger operates as an evaporator;

means including valves arranged between said circuits and said heat exchanger inlet lines for permitting parallel refrigerant flow through each of said circuits between said conduit and said heat exchanger inlet line when a heat exchanger is operating as an evaporator; and for directing all of said refrigerant flow from said heat exchanger inlet line to said series connected circuits when a heat exchanger is operating as a condenser.]

*6. A reversible refrigeration system adapted for heating and cooling, comprising:*

*a motor compressor unit;*

*an indoor heat exchanger and an outdoor heat exchanger each including a plurality of circuits, each circuit defining a single continuous passageway, a heat exchanger inlet line and a heat exchanger outlet line;*

*a valve for reversing the flow of refrigerant through said system to operate said system in a heating or cooling mode with each of said heat exchangers arranged interchangeably as a condenser or as an evaporator;*

*a conduit interconnecting said heat exchangers;*

*means connecting in series said single continuous passageways of each of the circuits in one of said heat exchangers arranged as a condenser to provide refrigerant flow successively through each of said single continuous passageway of each of said circuits between its heat exchanger inlet line and its outlet line when that heat exchanger operates as a condenser; and*

*means connecting in parallel said single continuous passageway of each of the circuits in said one of said heat exchangers when said one of said heat exchanger is arranged as an evaporator to provide refrigerant flow simultaneously through the continuous passageway of each of said circuits said conduit and said reversing valve when that heat exchanger operates as an evaporator.*

*7. The reversible refrigeration system recited in claim 6 wherein:*

*means, including a pair of one way valves arranged between said heat exchanger outlet lines and said conduit, to allow passage of refrigerant into said conduit from said circuits of the heat exchanger operating as a condenser and for preventing series flow of refrigerant from said conduit through said circuits of the heat exchanger operating as an evaporator.*

*8. The reversible refrigeration system recited in claim 6 wherein said means for connecting in parallel all of the circuits in the one of the said heat exchangers arranged as an evaporator includes a plurality of distribution means connected at one end to said conduit and at the other end to each of said circuits.*

*9. The reversible refrigeration system recited in claim 6 wherein:*

*means, including valves arranged between said circuits and said heat exchanger inlet lines, for permitting parallel refrigerant flow between said conduit and said heat exchanger inlet line through each of said circuits of the heat exchanger operating as an evaporator; and for directing all of said refrigerant flow from said heat exchanger inlet line to said series connected circuits of the heat exchanger operating as a condenser.*

*10. A reversible refrigeration system adapted for heating and cooling, comprising:*

*a motor compressor unit;*

*an indoor heat exchanger and an outdoor heat exchanger, each of said heat exchangers including a plurality of circuits, a heat exchanger inlet line and a heat exchanger outlet line;*

*a valve for reversing the flow of refrigerant through said system to operate said system in a heating or cooling mode with each of said heat exchangers arranged interchangeably as a condenser or as an evaporator;*

*means connecting in series all of the circuits in the one of said heat exchangers arranged as a condenser to provide refrigerant flow successively through each of said circuits between its heat exchanger inlet line and its outlet line when that heat exchanger operates as a condenser;*

*a conduit interconnecting said heat exchangers;*

*means, including a pair of one way valves arranged between said heat exchanger outlet lines and said conduit, to allow passage of refrigerant into said conduit from said circuits of the heat exchanger operating as a condenser and for preventing series flow of refrigerant from said conduit through said circuits of the heat exchanger operating as an evaporator;*

*a plurality of distribution means connected at one end to said conduit and at the other end to each of said circuits of each of said heat exchangers to arrange said circuits in parallel when that heat exchanger operates as an evaporator;*

*means, including valves arranged between said circuits and said heat exchanger inlet lines, for permitting parallel refrigerant flow between said conduit and said heat exchanger inlet line through each of said circuits of the heat exchanger operating as an evaporator; and for directing all of said refrigerant flow from said heat exchanger inlet line to said series connected circuits of the heat exchanger operating as a condenser.*

*11. A reversible refrigeration system adapted for heating and cooling, comprising:*

*a motor compressor unit;*

*an indoor heat exchanger and an outdoor heat exchanger; one of said heat exchangers including a plurality of circuits each circuit defining a single continuous passageway, said heat exchanger having an inlet line and an outlet line connected thereto;*

*a valve for reversing the flow of refrigerant through said system to operate said system in a heating or cooling mode with each of said heat exchangers arranged interchangeably as a condenser or as an evaporator;*

*a conduit interconnecting said heat exchangers;*

*means connecting in series said single continuous passageway of each of said circuits in said one of said heat exchanger to provide refrigerant flow successively through said single continuous passageway of each of said circuits between said inlet line and said outlet line when said one heat exchanger operates as a condenser; and*

*means connecting in parallel said single continuous passageway of each of said circuits in said one heat exchanger to provide refrigerant flow simultaneously through each single continuous passageway of each of said circuits between said conduit and said reversing valve when said one of said heat exchanger operates as an evaporator.*

*12. The reversible refrigeration system recited in claim 11 wherein:*

*means, including a one way valve arranged between said outlet line of said one heat exchanger, and said conduit to allow passage of refrigerant into said conduit from said circuits when said one heat exchanger is operating as a condenser and for preventing series flow of refrigerant through said circuits from said conduit when said one heat exchanger is operating as an evaporator.*

*13. The reversible refrigeration system recited in claim 12 wherein means for connecting in parallel all of said circuits in said one heat exchanger includes a plurality of distribution means connected at one end to said conduit and at the other end to each of said circuits to arrange said circuits in parallel when said one heat exchanger operates as an evaporator.*

*14. The reversible refrigeration system recited in claim 13 wherein:*

*means, including valves arranged between said circuits and said heat exchanger inlet line, for permitting parallel refrigerant flow through each of said circuits between said conduit and said heat exchanger inlet line when said one heat exchanger is operating as an evaporator; and for directing all of said refrigerant flow from said heat exchanger inlet line to said series connected circuits when said one heat exchanger is operating as a condenser.*

*15. A reversible refrigeration system adapted for heating and cooling, comprising:*

*a motor compressor unit;*

*an indoor heat exchanger and an outdoor heat exchanger; one of said heat exchangers including a plurality of circuits and having an inlet line and an outlet line connected thereto;*

*a valve for reversing the flow of refrigerant through said system to operate said system in a heating or cooling mode with each of said heat exchangers arranged interchangeably as a condenser or as an evaporator;*

*means connecting in series all of said circuits in said one heat exchanger between said inlet line and said outlet line when said one heat exchanger operates as a condenser;*

*a conduit interconnecting said heat exchangers;*

*means, including a one way valve arranged between said one heat exchanger outlet line and said conduit, to allow passage of refrigerant into said conduit from said circuits when said one heat exchanger operates as a condenser and for preventing series flow of refrigerant through said circuits from said conduit when said one heat exchanger operates as an evaporator;*

*a plurality of distribution means connected at one end to said conduit and at the other end to each of said*

*circuits to arrange said circuits in parallel when said one heat exchanger operates as an evaporator; and*

*means, including valves arranged between said circuits and said heat exchanger inlet line, for permitting parallel refrigerant flow through each of said circuits between said conduit and said heat exchanger inlet line when said one heat exchanger operates as an evaporator; and for directing all of said refrigerant flow from said heat exchanger inlet line to said series connected circuits when said one heat exchanger operates as a condenser.*

* * * * *